US010813370B2

United States Patent
Isaacs et al.

(10) Patent No.: US 10,813,370 B2
(45) Date of Patent: Oct. 27, 2020

(54) SYSTEM AND METHOD FOR PRODUCING STABLE FROZEN COCKTAILS AND SORBETS WITH HIGH ALCOHOL CONTENT

(71) Applicants: Joseph Isaacs, Palm Harbor, FL (US); Jason Mark Isaacs, Las Vegas, NV (US); Eric Kroeker, Las Vegas, NV (US)

(72) Inventors: Joseph Isaacs, Palm Harbor, FL (US); Jason Mark Isaacs, Las Vegas, NV (US); Eric Kroeker, Las Vegas, NV (US)

(73) Assignee: Buzz Pop Cocktails Corporation, Holiday, FL (US)

(*) Notice: Subject to any disclaimer, the term of this patent is extended or adjusted under 35 U.S.C. 154(b) by 0 days.

(21) Appl. No.: 15/335,244

(22) Filed: Oct. 26, 2016

(65) Prior Publication Data

US 2018/0110237 A1    Apr. 26, 2018

(51) Int. Cl.
  *A23G 9/04*    (2006.01)
  *C12G 3/04*    (2019.01)
  *C12H 6/02*    (2019.01)

(52) U.S. Cl.
  CPC ............... *A23G 9/045* (2013.01); *C12G 3/04* (2013.01); *C12H 6/02* (2019.02)

(58) Field of Classification Search
  None
  See application file for complete search history.

(56) References Cited

U.S. PATENT DOCUMENTS

| | | | | |
|---|---|---|---|---|
| 1,775,549 A | * | 9/1930 | Birdseye | B65B 63/08 229/87.08 |
| 5,019,414 A | | 5/1991 | Valdes | |
| 5,084,295 A | * | 1/1992 | Whelan | A23G 9/305 426/565 |
| 6,010,734 A | * | 1/2000 | Whelan | A23G 9/305 426/565 |
| 9,339,051 B2 | | 5/2016 | Melvin | |
| 2001/0041208 A1 | | 11/2001 | Orris et al. | |
| 2003/0008041 A1 | * | 1/2003 | Budwig | A23G 1/206 426/115 |
| 2003/0129282 A1 | * | 7/2003 | Solorio | A23G 9/045 426/102 |
| 2003/0215548 A1 | * | 11/2003 | Mihajlovic | A23G 9/04 426/101 |
| 2005/0142253 A1 | | 6/2005 | Purcell | |
| 2005/0281933 A1 | * | 12/2005 | Squicciarini | A61K 9/0095 426/565 |
| 2008/0226777 A1 | * | 9/2008 | Helfend | C12G 3/06 426/134 |
| 2012/0128854 A1 | * | 5/2012 | Melvin | A23G 9/32 426/565 |

FOREIGN PATENT DOCUMENTS

| | | | | |
|---|---|---|---|---|
| EP | 0268097 A1 | 5/1988 | | |
| WO | 1996011578 A1 | 4/1996 | | |
| WO | 1997015199 A1 | 5/1997 | | |
| WO | WO-0030468 A1 | * | 6/2000 | ............... C12G 3/06 |
| WO | 2000042862 A1 | 7/2000 | | |

OTHER PUBLICATIONS

The Inner Workings of a Batch Freezer. Jul. 15, 2015. P Magazine. Retrieved from: <https://pregelamerica.com/pmag/articles/the-inner-workings-of-a-batch-freezer/>.*
Dippin Flavors. Apr. 14, 2014. Retrieved from: <https://dippinflavors.com/fine-frozen-dessert-guide/>.*

* cited by examiner

*Primary Examiner* — Erik Kashnikow
*Assistant Examiner* — Ashley Axtell
(74) *Attorney, Agent, or Firm* — Boag Law, PLLC

(57) ABSTRACT

A method of preparation and composition of frozen sorbet type products containing 12-40% by volume of alcoholic beverages is presented. The ice cream type products include sherbets and sorbets. When such products are prepared according to the method herein described their texture and structure remain stable and homogeneous and no separation of alcoholic beverage occurs after freezing and during storage of the frozen products with a freezer shelf life in excess of 12 months.

16 Claims, No Drawings

SYSTEM AND METHOD FOR PRODUCING STABLE FROZEN COCKTAILS AND SORBETS WITH HIGH ALCOHOL CONTENT

BACKGROUND

A method of preparing a frozen cocktail product is disclosed in which a frozen sherbet- or sorbet-style preparation is formed using a relatively high concentration of premium spirits including, for example, rum, vodka, tequila, and whiskey. The product from this method approximates the characteristics of a traditional cocktail, but in a frozen form that remains stable and homogenous during storage, without separation of the alcoholic beverage contained in the finished frozen products.

Frozen cocktails remain an immensely popular beverage item in restaurants and bars, exhibiting strong sales both in warm-weather environments and in the summer, and even in cooler months. Frozen cocktails are often sold at a premium, with margins as high as 60-70%, making them attractive items for restaurant and bar owners.

Restaurants and bars regularly make frozen cocktails available, either made individually to order, or using the ubiquitous auger-based frozen drink machines that turn the frozen product continuously while freezing the product. The Carpigiani Fast Freeze 2 Bowl Frozen Drink Machine and Bunn Ultra 2 HP Frozen Drink Machine are two such examples. Blender-based frozen cocktails are an alternative to expensive single-purpose machinery, but are limited to production in small batches of only a few servings. Utilizing a conventional blender can tie up bartending staff, increase customer wait times, and increase mess, all of which can translate to reduced profit.

Frozen cocktails produced in bars and restaurants typically have the consistency of ice slush and are made for on-premises immediate consumption. No concern must be given to stability during transport or in storage since the product is consumed on-site, often shortly after production. The homogeneity of these bar and restaurant variations is also often not a concern since the product is being constantly turned, or has just been prepared. It is not uncommon for frozen cocktails in bars and restaurants to be served with an additional puddle of alcohol on top, emphasizing the low importance of stability and homogeneity in the drink.

The increased popularity and availability of frozen cocktails has also led to a desire on the part of consumers to have these beverages available at home, either because of the reduced cost or simply the desire to enjoy these beverages in the convenience of one's home. However, home frozen cocktail preparation can be time-consuming, messy and even costly. Besides the traditional ingredients for a home bar, many frozen cocktail preparations require fresh fruit, which can require washing, peeling, chopping, and the like. Additionally, a conventional home blender may be unsuitable for crushing ice generated by a home freezer. As a result, many consumers have sought out an alternative.

Pre-made frozen cocktails, available through supermarkets or liquor stores, have been introduced in the past. However, these pre-made products are prone to several problems that result when alcohol is introduced into an ice cream or sorbet mix.

Traditional non-alcoholic sorbet is made by mixing a sorbet base of water, sugar, and typically fresh fruit. In commercial variations, a stabilizer may be added to enhance the texture or stability of the product and the finished product run through a batch freezer. Sherbet comprises all the ingredients of a sorbet, but with the addition of dairy. Sherbet typically contains 1-3% milkfat, as compared to ice cream, which typically has a milkfat content of at least 10%.

Introducing alcohol into the formulation can cause the resulting product to become unstable. The consistency, texture and homogeneity of the product can become compromised, making transport or storage impractical. Specifically, at certain concentrations of alcohol, the alcohol and bulk of the sorbet (or sherbet) will separate, leaving behind pieces of ice or frozen fruit juice, and making the product unattractive to consumers. The product may also shrink and pull away from the sides of the container, which is also unattractive to consumers.

The difference between the freezing point of alcoholic beverages and the remaining ingredients of sherbets and sorbets is partly to blame. The freezing point of spirits varies slightly from type to type, but is generally −15° C. for 60 proof spirits, −19° C. for 70 proof spirits, −24° C. for 80 proof spirits, and −114° C. for 190 proof grain alcohol. In contrast, water freezes at 0° C., as do many of the fresh juices and purees used in cocktails, creating an imbalance.

Maintaining the alcohol portion of a frozen cocktail comprising, for example, 80 proof tequila, would necessitate a temperature of −24° C. to prevent the tequila from returning to a liquid state. In a typical home freezer set to −18° C., or supermarket freezer set to −20° C. alcohol will not freeze with the remaining ingredients of a sherbet or sorbet. As a result, even when the non-alcoholic elements of the sherbets or sorbets are kept frozen, the alcoholic elements may still be unfrozen or in a slushy state, allowing the alcohol to separate from the mass of the sorbet or sherbet product and accumulate on the bottom of the container in which the product is stored.

This problem is compounded as the volume of alcohol is increased, and the strength (measured in proof) is increased.

The separation of the alcohol destroys the homogeneity of the texture and of the structure of the frozen products and creates an undesirable second phase at the bottom of the container, consisting mainly of alcohol.

To avoid undesirable separation, alcoholic beverages have been very sparsely used in ice cream type products, often only as a flavoring component in concentrations no higher than 0.5%. Alcoholic beverages have typically been used in ice creams, sherbets and sorbets in residual concentrations, generally originating from maceration of dried fruits to be added to the finished products. The resulting alcoholic concentration is usually lower than 0.25%. *Marshall and Arbuckle's Ice Cream* (Springer; 5th ed. 2000), recommends using rum flavor and not the actual alcoholic beverage in a recipe for punch-flavored ice cream.

Various solutions have been proposed.

For example, U.S. Pat. No. 5,019,414 discloses a method for preparation of an alcoholic pipeable gel that can be piped over ice cream type products. The pipeable gel is not present during the freezing process and does not become an integral part of the finished product. A mixing operation would have to be conducted at the time of the consumption of the ice cream product in order to integrate the gel with ice cream, which would alter the structure and texture of the finished product.

European Pat. Pub. No. EP0268097A1 discloses a pre-packaged soft composition comprising ethyl alcohol, which can be frozen at the consumption site. Upon freezing, the pre-packaged formulation results in a product with the consistency and texture of a soft ice or slush. This product, which relies on ethyl alcohol as opposed to premium spirits, is unable to maintain the consistency of a more solidified sorbet or sherbet style product.

U.S. Patent App. Pub. No. US2001041208 describes a method for stabilizing ethyl alcohol in ice cream. A blend of milk solids and stabilizers are added to the basic ice cream mix prior to the admixture of ethyl alcohol with the ice cream mix. The method described in this application does not address a direct stabilizing action on the alcoholic beverage by means of preparing a stabilized alcoholic beverage prior to freezing it into a sorbet or sherbet. The method also precludes manufacturing of sorbets due to the compulsory presence of milk solids in the stabilizing mix.

Alternate methods have been proposed which require or promote the use of a heat-soluble hydrocolloid stabilizer. Various products (e.g., those lacking dairy) require no pasteurization and an underlying mix may not be heated during manufacture. A heat-soluble stabilizer would thus require an additional step of heating, and then cooling, the mix.

What is thus needed is a method for preparing frozen cocktails containing flavored alcohol and spirits in a sorbet or sherbet form.

What is further needed is a method for preparing frozen cocktails with an alcohol content approximating the actual cocktail, i.e., 12-40%.

What is further needed is a method for preparing frozen cocktails that results in a product that is stable, storable at a range of temperatures, and maintains a homogenized state during transport and storage.

What is further needed is a method for preparing frozen cocktails that can be conducted using a cold-soluble stabilizer.

SUMMARY

In embodiments, a method of manufacturing a frozen alcoholic cocktail product or frozen beverage the steps of: (1) forming a cocktail base that includes from about 40-44% fruit puree or juice; from about 0.15%-0.29% of a cold-soluble hydrocolloid agent; and a quantity of an ethanol-based alcoholic beverage spirit sufficient to bring the overall alcohol content of the cocktail base to between 12-40%; (2) agitating the cocktail base until the hydrocolloid agent has been dissolved in the cocktail base the cocktail base has achieved a creamy texture; (3) chilling the cocktail base; (4) forming the frozen cocktail product by passing the cocktail base through a homogenizer and batch freezer until a sorbet-like consistency has been achieved; (5) dispensing the frozen cocktail product into a plurality of containers; and (6) deep-freezing the churned mixture prior to sealing the containers.

In embodiments, the chilling step is performed for at least 60 minutes, and said deep-freezing step is performed for at least 12 hours. In other embodiments, the fruit puree or juice comprises fresh fruit puree.

In embodiments, a cocktail mix further includes from about 40-44% distilled or purified water, or from about 40-44% liquid sweetener, or some combination thereof. In embodiments, the quantity of ethanol-based alcoholic beverage is sufficient to bring the overall alcohol content of the cocktail base to between 26-40%.

In embodiments, the ethanol-based alcoholic beverage is an 80-proof spirit or, alternatively, a 100-proof spirit. In embodiments, the ethanol-based alcoholic beverage is one of: rum, tequila, vodka, bourbon, scotch, cognac, and whiskey, or other distilled spirits. In alternative embodiments, the ethanol-based alcoholic beverage has been brewed, or fermented.

In embodiments, the cold-soluble hydrocolloid agent is a carrageenan, xanthan gum, or guar gum.

In alternate embodiments, the cocktail base further comprises from about 1-3% milkfat, and may or may not be pasteurized.

In embodiments, the frozen cocktail product is dispensed into a plurality push-pop single-serving container, which may, preferably, be configured to hold approximately 3.8 ounces.

DETAILED DESCRIPTION

A method and composition for preparing sherbet and sorbet containing is described using, preferably, premium and/or flavored alcohol. In embodiments, the finished products made according to the method disclosed herein will have between 12-40% of alcohol as measured by the volume of the finished sorbet or sherbet product, and will remain stable, smooth, and homogenous, with little or no separation of the alcohol from the remaining product mass.

This invention can be used for preparation of alcoholic ice creams, sherbets and sorbets flavored with alcoholic beverages or combination of alcoholic beverages manufactured by any of the conventional manufacturing methods, such as distillation, fermentation, or mixture or maceration of ethyl alcohol with flavoring agents.

It should be noted that the terms "flavored alcohol," "premium alcohol," and "spirits" are used interchangeably to refer to any brewed, fermented, or distilled alcoholic beverage including, for example, vodka, rum, tequila, mezcal, gin, whiskey, rye, absinthe, brandy, liqueurs, scotch, vermouth, wine, sake, beer and soju, among others. A description of any one spirit herein should not be interpreted to foreclose the substitution of another spirit, unless otherwise noted.

In embodiments, a fresh fruit cocktail beverage is prepared and stabilized in its entirety in a single step, without the need for a two-step process of stabilizing the alcohol before combining the stabilized product with the finished ice cream type product. In embodiments, an ethyl alcohol stabilizing mix is prepared, comprising distilled spirits, flavoring, filtered water and hydrocolloids.

In embodiments, a cocktail base is first prepared, which may include the base elements of the cocktail such as flavored alcohol, fruit puree, juice, and other flavorings. For example, in a strawberry daiquiri preparation, frozen strawberry puree may be combined with premium rum and lime juice before adding distilled water and stabilizer. Alternatively, a melon ball preparation may incorporate cantaloupe puree, premium vodka, and orange juice, that is combined with water and stabilizer. A margarita preparation may use premium tequila, orange liqueur, and lime juice, which are mixed with water and stabilizer in a single process.

In alternate embodiments, fresh fruit puree may be omitted entirely, and replaced with a quantity of juice or other non-alcoholic liquid. For example, a lemon drop martini preparation comprising vodka, lemon juice, distilled water, and stabilizer is suitable for use with the present invention. Similarly, a gin and tonic preparation would also be suitable for use with the present invention. It will be appreciated that the variety of frozen alcoholic cocktails that can be utilized with the present invention is vast and is limited only by consumer taste preferences.

In embodiments, a stabilizer added to the cocktail preparation may incorporate a food-grade hydrocolloid, a polysaccharide chain that is able to interact with water to thicken and form gels. These hydrocolloids promote effective retention of the alcoholic beverage or ethyl alcohol in the bulk of the ice cream, sherbet or sorbet products during and after the freezing process. Specifically, it has been found that hydrocolloids mixed with water in a stabilizing mix form tri-dimensional gel structures in which microscopic portions of water may be trapped. Where the water has been mixed with other soluble or miscible compounds—such as ethyl alcohol—prior to the admixing of hydrocolloids, the soluble or miscible compound will also be trapped in the gel structure. The ethyl alcohol contained in alcoholic beverages or in mixtures of water and alcohol used in the preparation of the ethyl alcohol stabilizing mix will thus become trapped in the hydrocolloidal three-dimensional gel structures. Once trapped, the ethyl alcohol from the ethyl alcohol stabilizing mix will not exude from the bulk of the ice cream, sherbet or sorbet mixes during or after the freezing process. The alcoholic beverage or ethyl alcohol trapped in the tri-dimensional hydrocolloid gel structures retains its full flavor and aroma.

Exemplary hydrocolloid agents for use with the present invention include Guar and Xanthan gums, either individually or in combination, with or without added gelatin. Guar gum is readily soluble in cold mixes and forms very viscous solutions, even when not in the presence of heat. The viscosity of such solutions increases as the temperature of the mix decreases.

Xanthan gum, however is a polysaccharide secreted by the bacterium Xanthomonas campestris and is used as a food additive and rheology modifier, commonly used as a food thickening agent and a stabilizer (for example, to prevent ingredients from separating). Carrageenans is another common stabilizer, also known as Irish moss. The lambda form of carrageenan is soluble in water at low temperatures, making it desirable for a cold process such as described by embodiments of the present invention. Carrageenans form gels, the strength of which can be increased by the addition of potassium ions.

Alternatively, cellulose gums may be employed, such as sodium carboxymethylcellulose, methylcellulose, methyl-ethylcellulose, and hidroxypropylcellulose. These hydrocolloids are easily dissolved in water and mixtures of water and ethyl alcohol, have a high water holding capacity, and form strong gels when in combination with carrageenan or guar gum. Gelatin may be also added to any of the foregoing hydrocolloid mixes to enhance water holding capacity, increases the viscosity of the mix, and contributes to improving the smoothness of the mix.

In a preferred embodiment, the percentage of hydrocolloid in the sherbet or sorbet base is approximately 0.15%-0.29%, which may vary depending on the ingredients used in the cocktail formulation, and also the particular stabilizer used.

In a commercial preparation, the ingredients of the alcoholic cocktail base may first be measured or weighted. The liquid and solid ingredients comprising stabilizers and the cocktail base (i.e., vodka, rum, tequila, or whiskey; fruit purees or flavorings) are placed in a vat and blended together to form a homogeneous solution. The cocktail ingredients may be mixed for three to four minutes in a preferred embodiment, until all parts are evenly distributed and the solution is in a viscous state between a water and a gel and all traces of stabilizer have been dissolved in the liquid. In embodiments, a mixing vat is equipped with agitation, and the mix is agitated for at least 20 minutes or until the mix is completely homogenous with a creamy, whipped texture that is pliable.

Sherbets, which contain dairy, may be pasteurized and then homogenized before freezing. The intermediate pasteurization process—which is often performed by the batch freezer—will be within the capability of those of ordinary skill in the art.

Prior to batch freezing, after the sorbet base has been mixed and stabilized, various mix-ins may be added to the product. In embodiments, frozen fruit chunks, chocolate, candy, seeds, and other additives may be introduced during this step. Adding these ingredients during batch freezing helps insure the structural integrity of the additives, which may be fragile and could be damaged by the mixing and agitation process, or impacted by any residual heat that is generated during that process. Late-stage mixing of these ingredients insures that they remain a detectable part of the finished product and are not broken down during the prior steps of the process.

This solution may then be run through a batch freezer which rotates the base while freezing it, introducing air into the mix in the process. While various commercial and consumer batch freezers may be used with the present invention, it has been found that the Carpigiani LB-302G batch freezer is well suited for use with the present invention, providing a consistent finished product, regardless of batch size, with greater stability and better storage characteristics. This model utilizes the patented "Hard-O-Dynamic" system that takes into consideration the freeze cycle and desired consistency, and provides dynamic thermal modulation to precisely control output. The LB-302G is a medium-to-high volume machine, though any Hard-O-Dynamic machine would be preferable for use with the present invention. Various other machines by other manufacturers may of course be used with the invention.

In embodiments, the finished product may be dispensed into a container suitable for the desired market or application. Examples include, but are not limited to single-serving cups, tubs capable of holding multiple servings, and other containers suitable for both retail and wholesale sale.

In a preferred embodiment, the finished product may be dispensed into a push-pop-style container. This style of container comprises a main cylinder portion that is loaded with the frozen product, with a removable cap or cover covering the opening. A pusher element may be fitted at the base of the cylinder and be configured to move axially within the cylinder in response to a force imparted by the consumer. The force applied to the pusher element may then be transferred to the frozen product, causing it to be dispensed out the top end of the cylinder for immediate consumption. Grooves, ridges, or guides on the interior of the cylinder may keep the pusher element substantially level with the radial axis of the cylinder.

A push-pop-style container may be formed from treated paper, treated cardboard, paperboard, polycarbonates, or any other food-grade material that is substantially impervious to water. Coatings such as wax may be applied to the material to provide enhanced water resistance and integrity. The container may be made visually appealing to consumers through graphics and colors applied to the packaging. In a preferred embodiment, a push-pop-style container has a single-serving volume of 3.3 oz. is utilized. For an exemplary frozen composition having an alcohol content of 40%, a 3.3 oz. serving provides approximately 1⅓ oz. of alcohol, which is just under what is generally regarded as a single serving.

Products prepared according to the method and composition herein presented can contain substantial quantities of alcohol such as rum, vodka, tequila and whiskey without suffering changes of texture and structure caused by the separation of the alcohol upon freezing and during storage in the frozen state.

Embodiments of the present invention are useful for creating sherbet and sorbet products with stable and homogeneous texture and structure. The homogeneity of texture and structure is durable and remains unchanged for a minimum of 12 months (while frozen at −19.5° to −30° C.) thus allowing manufacturing of the products at production level scale and transportation and storage of the finished frozen products, so that the products can reach distribution channels and end users.

The sherbets and sorbets manufactured using this invention bring a large quantity of novel flavors to the end user and are a refreshing alternative for alcoholic drinks.

The consistency of the finished products allows for the amount of alcohol contained therein to be predictable and measurable, enabling adequate labeling of the packaging, with inclusion of information about the alcohol content of the product. Such a feature may be legally required in certain jurisdictions.

Although sherbets and sorbets are here described as the target final products of this invention, this invention can be used for the preparation of all the variations of this type of frozen food products, such as low fat ice creams and sherbets, frozen yogurts, ices, granitas, soft serve ice creams, gelatos and frozen mousses. This invention can also be used for manufacturing ice cream type products with no milk, consumed in diets with restrictions regarding milk products.

Embodiments of the invention may also be utilized with non-distilled spirits including wine (including fortified wines such as port), sake, beer, cider, mead, and shandy, among others. In embodiments, alcohol-free variations may also be prepared.

The present invention will be further illustrated by the following Examples. The Examples are illustrative only and do not limit the claimed invention regarding the materials, conditions, equipment, process and the like recited herein.

EXAMPLE 1

Strawberry Daquiri

This example demonstrates the small-batch preparation of a strawberry daiquiri frozen cocktail product using the following ingredients:

| Ingredient | Quantity | Units |
| --- | --- | --- |
| Fresh Fruit Puree | 133.93 | oz. |
| Distilled Water | 133.93 | oz. |
| Rum | 45.00 | oz. |
| Xanthan Gum | 0.90 | oz. |

First, a single-vessel preparation comprising distilled water, fresh strawberry puree, rum, and a cold-activated stabilizer was assembled. In this Example, a Xanthan gum was used in a concentration of approximately 0.29 percent. The water was distilled and combined with the mix which was then mixed with an immersion blender until the stabilizer was fully dissolved and the liquid thickened, approximately ten minutes.

Next, the stabilized mix was chilled for one hour to allow the flavors to settle. The settled preparation was then loaded into a Carpigiani LB-302G batch freezer then churned to a sorbet-like consistency was reached, approximately 5-15 minutes. Finally, the finished product was then dispensed into containers and placed in a deep freezer for 12 hours before sealing, and then dispensed into individual serving cups.

EXAMPLE 2

Bloody Mary

This example demonstrates the preparation of a Bloody Mary frozen cocktail product with the following ingredients:

| Ingredient | Quantity | Units |
| --- | --- | --- |
| Bloody Mary Mix | 6,000 | oz. |
| Distilled Water | 6,000 | oz. |
| Vodka | 1,750 | oz. |
| Guar Gum | 30 | oz. |

A single mix was assembled comprising distilled water, vodka, guar gum, and Bloody Mary mix. Here, a commercial Bloody Mary mix was utilized, comprising water, tomato juice, liquid sweetener, salt, citrus juice, and spices. Guar gum in a concentration of 0.22 percent was utilized as a stabilizer.

The mix was then mixed with an immersion blender until the guar gum was fully dissolved and the liquid thickened, approximately 5-15 minutes. Next, the stabilized mix was chilled for one hour to allow the flavors to settle, and loaded into a Carpigiani LB-302G batch freezer for churning, set at a medium aeration. Finally, the finished product was then dispensed into containers and placed in a deep freezer for 12 hours before sealing, and then dispensed into individual push-pop-style serving containers.

EXAMPLE 3

Pina Colada

This example demonstrates the preparation of a Pina Colada frozen cocktail product using the following ingredients:

| Ingredient | Quantity | Units |
| --- | --- | --- |
| Coconut Milk | 6,000 | grams |
| Simple Syrup | 6,000 | grams |
| Rum | 1,750 | grams |
| Carrageenan | 20 | grams |

As with Examples 1 and 2, a single mix was prepared consisting of coconut milk, simple syrup, rum, and Carrageenan, a stabilizer. The specific formulation of simple syrup is a matter of taste preference and here, a 1:1 ratio of sugar to water was used. Prepared commercial coconut milk was used in this particular formulation. All ingredients are combined, and mixed with an immersion blender, waiting until all the Carrageenan stabilizer has been dissolved.

The mix is then chilled, and churned in a batch freezer until reaching sorbet consistency. The finished product was then dispensed into containers and placed in a deep freezer for 12 hours before sealing.

It will be understood that there are numerous modifications of the illustrated embodiments described above which will be readily apparent to one skilled in the art, including any combinations of features that are individually disclosed or claimed herein, explicitly including additional combinations of such features. These modifications and/or combinations fall within the art to which this invention relates and are intended to be within the scope of the claims, which follow. It is noted, as is conventional, the use of a singular element in a claim is intended to cover one or more of such an element.

We claim:

1. A method of manufacturing a frozen alcoholic cocktail product or frozen beverage, comprising:
    forming a non-dairy cocktail base comprising: from about 40-44% fruit puree or juice;
    from about 0.15%-0.29% of a cold-soluble hydrocolloid agent; and a quantity of an ethanol-based alcoholic beverage spirit sufficient to bring the overall alcohol content of the cocktail base to between 12-40%;
    wherein the cocktail base is formed by mixing the cold-soluble hydrocolloid agent to a mix containing the fruit puree or juice and the ethanol-based alcoholic beverage spirit without stabilizing the ethanol-based alcoholic beverage spirit before combining the ethanol-based alcoholic beverage spirit with the remaining ingredients of the cocktail base;
    agitating the cocktail base until said hydrocolloid agent has been dissolved in said cold-soluble cocktail base and the cocktail base has achieved a creamy texture;
    pasteurizing the agitated cocktail base;
    chilling the cocktail base for at least 60 minutes;
    forming a frozen cocktail base by blending said cocktail base and batch freezing to form a churned mixture;
    dispensing said churned mixture into a plurality of containers;
    deep-freezing said churned mixture prior to sealing the containers, wherein the deep freezing step is performed for a period of at least 12 hours.

2. The method of claim 1 in which the cocktail base further comprises from about 40-44% distilled or purified water.

3. The method of claim 1 in which the quantity of ethanol-based alcoholic beverage spirit is sufficient to bring the overall alcohol content of the cocktail base to between 26-40%.

4. The method of claim 1 in which the ethanol-based alcoholic beverage spirit is an 80-proof spirit.

5. The method of claim 1 in which the ethanol-based alcoholic beverage spirit is a 100-proof spirit.

6. The method of claim 1 in which the ethanol-based alcoholic beverage spirit is one of: rum, tequila, vodka, bourbon, scotch, cognac, and whiskey.

7. The method of claim 1 in which the ethanol-based alcoholic beverage spirit has been distilled.

8. The method of claim 1 in which the ethanol-based alcoholic beverage spirit has been fermented.

9. The method of claim 1 in which the ethanol-based alcoholic beverage spirit has been brewed.

10. The method of claim 1 in which the fruit puree or juice comprises fresh fruit puree.

11. The method of claim 1 in which the cold-soluble hydrocolloid agent is a carrageenan.

12. The method of claim 1 in which the cold-soluble hydrocolloid agent is xanthan gum.

13. The method of claim 1 in which the cold-soluble hydrocolloid agent is guar gum.

14. The method of claim 1 in which the plurality of containers are each a single-serving container comprising a main cylinder portion, with a removable cap or cover and a pusher element fitted at the base of the main cylinder portion configured to move axially within the main cylinder portion.

15. The method of claim 1 in which the plurality of containers are each are configured to hold approximately 3.8 ounces.

16. A method of manufacturing a frozen alcoholic cocktail product or frozen beverage, comprising:
    forming a cocktail base comprising from about 40-44% fruit puree or juice; from about 0.15%-0.29% of a cold-soluble hydro colloid agent; and a quantity of an ethanol-based alcoholic beverage spirit sufficient to bring the overall alcohol content of the cocktail base to between 12-40%, wherein the cocktail base is formed in by mixing the cold-soluble hydrocolloid agent to a mix containing the fruit puree or juice and the ethanol-based beverage spirit without stabilizing the ethanol-based alcoholic beverage spirit before combining the ethanol-based alcoholic beverage spirit with the remaining ingredients of the cocktail base;
    agitating the cocktail base until said hydrocolloid agent has been dissolved in said cold-soluble cocktail base and the cocktail base has achieved a creamy texture;
    pasteurizing the agitating cocktail base;
    chilling the cocktail base for at least 60 minutes;
    freezing said cocktail base to form a frozen cocktail base;
    dispensing said frozen cocktail base into a plurality of containers; and
    deep-freezing said frozen cocktail base prior to sealing the containers.

* * * * *